Nov. 18, 1941.  R. M. THOMPSON  2,263,343
SLAT BELT FOR PRESSES AND FILTER PRESSES
Filed April 1, 1938  3 Sheets-Sheet 1

INVENTOR
Robert M. Thompson
BY
ATTORNEY

Nov. 18, 1941.   R. M. THOMPSON   2,263,343
SLAT BELT FOR PRESSES AND FILTER PRESSES
Filed April 1, 1938   3 Sheets-Sheet 2
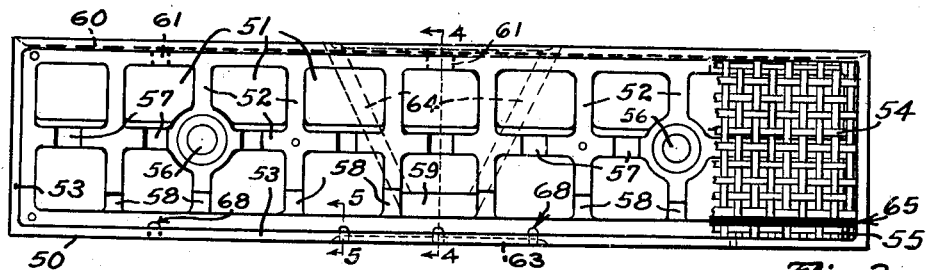
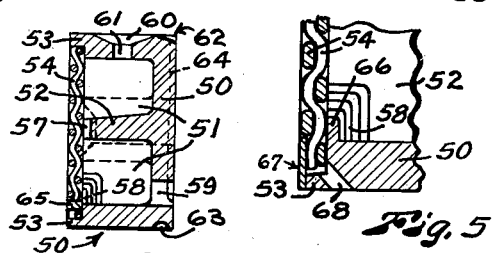 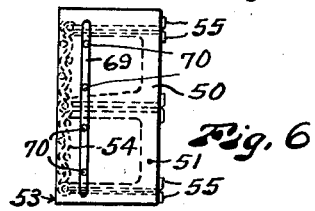
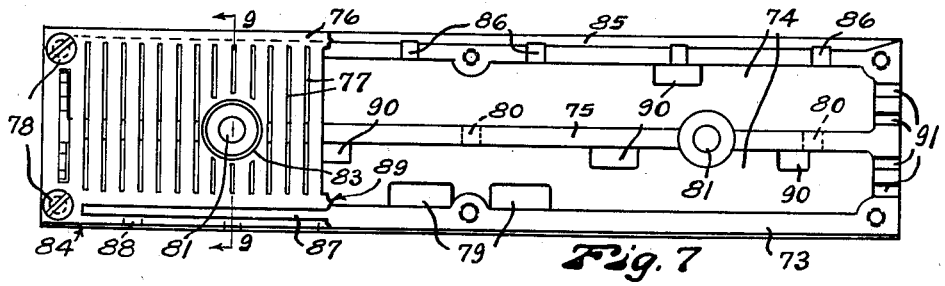
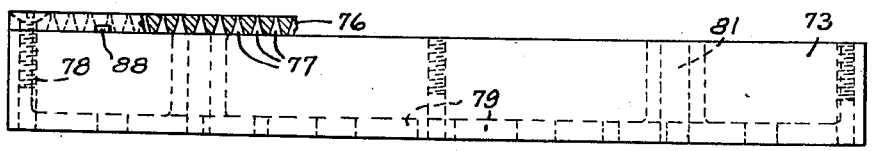
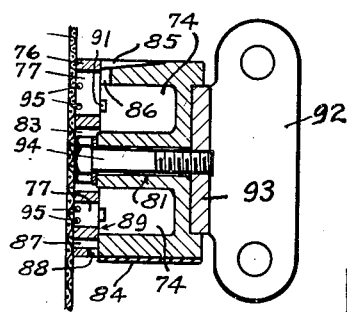
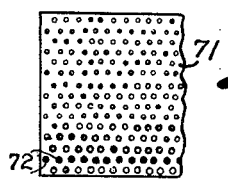
INVENTOR.
Robert M. Thompson
BY
ATTORNEY Nov. 18, 1941.  R. M. THOMPSON  2,263,343
SLAT BELT FOR PRESSES AND FILTER PRESSES
Filed April 1, 1938  3 Sheets-Sheet 3
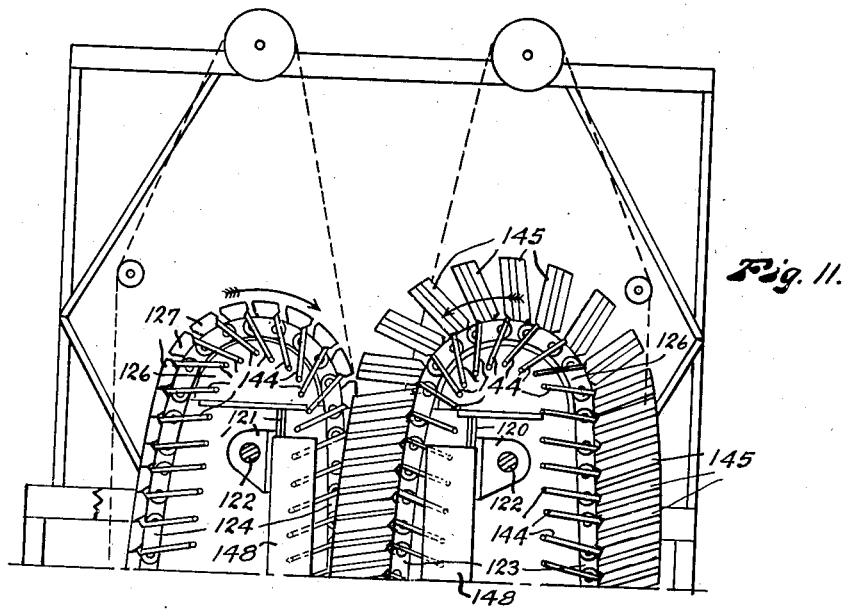
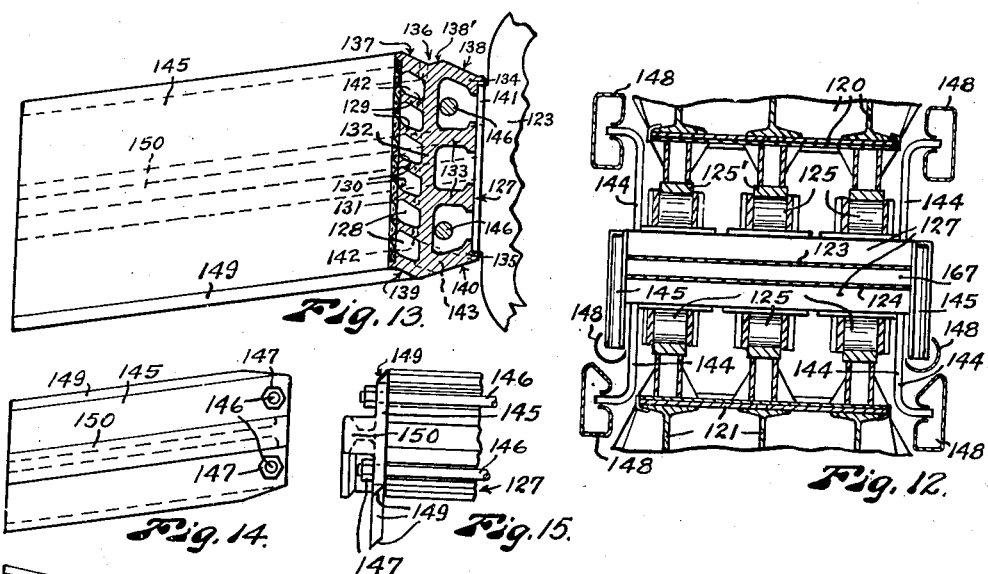
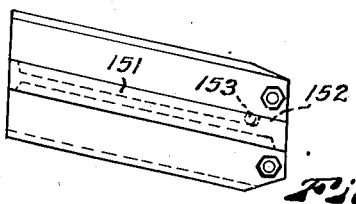
INVENTOR
Robert M. Thompson
BY
G. Wright Arnold
ATTORNEY Patented Nov. 18, 1941

2,263,343

UNITED STATES PATENT OFFICE 2,263,343

SLAT BELT FOR PRESSES AND FILTER PRESSES

Robert M. Thompson, Seattle, Wash., assignor to Thompson Continuously Operating Filter Press Company, Seattle, Wash., a corporation of Washington Application April 1, 1938, Serial No. 199,341

13 Claims. (Cl. 210—197)

This invention relates to the art of devices designed to separate fluids or liquids from other fluids or liquids of greater fluidity and fluids or liquids from solids.

This application is a continuation in part of my application Serial No. 650,990, filed January 10, 1933, Patent No. 2,112,869, issued April 5, 1938.

More particularly this invention relates to slats for forming a moving slat belt of a combined press and filter press or of a press designed for continuous operation and in which the said press or filter press is characterized by the development of extremely high pressures and practical and efficient operation. Particularly does my invention relate to simplifying and reducing the cost of the filtration or filtration step in the industrial arts, which step at present constitutes one of the expensive operations in manufacturing. The invention in general relates to the art of filtering or filtration disclosed in Patent No. 1,778,342, issued to me October 14, 1930 and Patent No. 1,997,611, issued April 16, 1935.

It is common practice in the art of filtration to refer to devices designed for the separation of materials by the application of force or pressure to the materials from without, as "presses"; while devices designed for the separation of materials by having the force or pressure transmitted through the materials themselves as "filter presses." "Filter presses" are usually used where the amount of solids to be separated is but a small proportion of the total mobile mass composed of said solids and liquids in which said solids are disposed and hence the said materials are pumped into the filter press. "Presses" on the other hand, are used where the proportion of solid matter is normally much greater in relation to that of the liquid composing said materials to be filtered. The slat herein disclosed is equally well adapted for use in connection with either a "press" or a "filter press."

Other objects of the invention are to provide slats through and out of which liquid will drain freely and easily and by which the possibility of the liquid re-entering the solid matter or cake after it has been expressed therefrom will be reduced to a minimum and to provide slats, having on the ends thereof, wing means adapted to form a closure for the ends or sides of a filter chamber.

The above mentioned general objects of my invention, together with others inherent in the same, are attained by the mechanism illustrated in the following drawings, the same being preferred exemplary forms of embodiment of my invention, throughout which drawings like reference numerals indicate like parts:

Fig. 3 is a front elevation, with parts broken away, of one form of slat for the main slat belts, a wire mesh being used on the face of said slat.

Fig. 4 is a sectional view on broken line 4—4 of Fig. 3.

Fig. 5 is a fragmentary sectional view substantially on broken line 5—5 of Fig. 3 illustrating details of the drainage means of the slat shown in Figs. 3 and 4.

Fig. 6 is an end view of said slat.

Fig. 7 is a plan view with parts broken away of another form of filter belt slat in which a slotted plate is used on the face of the slat.

Fig. 8 is an edge view of the slat shown in Fig. 7.

Fig. 9 is a sectional view substantially on broken line 9—9 of Fig. 7.

Fig. 10 is a fragmentary elevation of a perforated plate which may be used on the filter belt slat shown in Figs. 3 to 6 in place of the wire mesh plate shown in said Figs. 3 to 6.

Fig. 11 is a fragmentary side elevation of a combined press and filter press embodying a preferred form of slat constructed in accordance with this invention.

Fig. 12 is a detached plan view on a larger scale than Fig. 11, showing two of the slats illustrated in Fig. 11 in operative relation to each other and showing the liquid take off means connected with said slats.

Fig. 13 is a cross section view on a larger scale than Figs. 11 and 12 of the slat shown in Figs. 11 and 12.

Fig. 14 is an elevation of one of the slat wings provided on the end of the slat shown in Figs. 11, 12 and 13, the slope of said slat wing being downwardly in a direction away from the slat whereby liquid following the slat wing will tend to drain away from the slat toward the outer end of the wing.

Fig. 15 is an end elevation with parts in section of said slat wing.

Fig. 16 is a fragmentary elevation of a modified form of slat wing of the type shown in Figs. 11 to 15, said slat wing sloping downwardly toward the slat when the slat is in proper position to cooperate in forming a filter chamber, whereby the drainage of liquid along said slat wing will be toward the slat.

Figure 1:
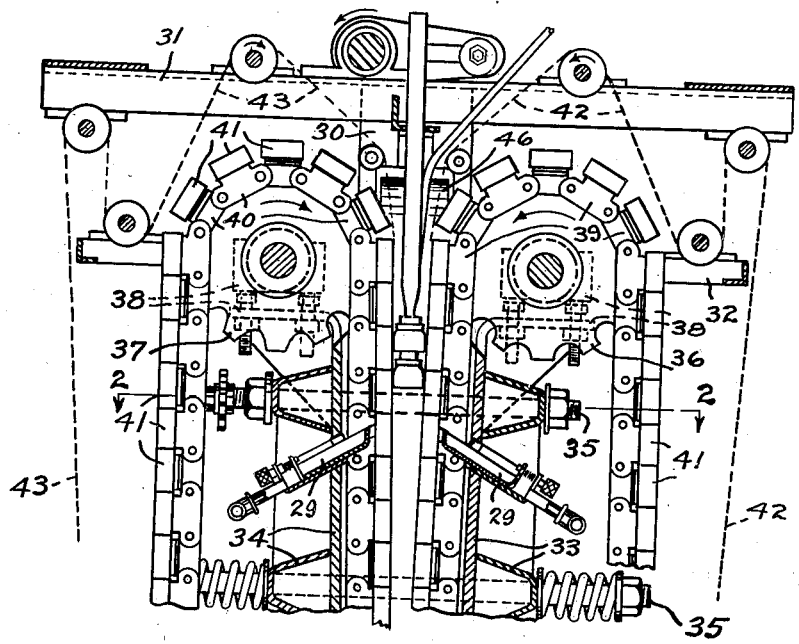
Figure 1 is a fragmentary sectional view of a combined press and filter press using slats constructed in accordance with this invention.
Figure 2:
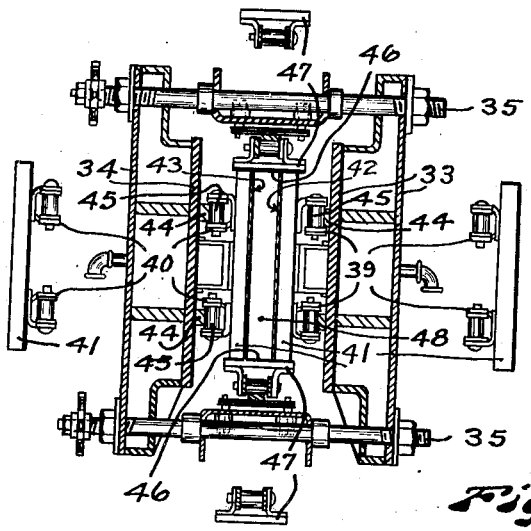
Fig. 2 is a cross-section, substantially on broken line 2—2 of Fig. 1, parts being omitted.

Referring to Figs. 1 and 2, I show a fragmentary view of the upper portion of a combined press and filter press employing slats constructed in accordance with this invention. In these figures I show the upper portion of an upright frame member 30, which constitutes part of the support for overhead frame members 31 and 32. Two pendent frame members 33 and 34, of a form fully disclosed in the patent hereinbefore identified, of which this application is a continuation-in-part, are supported with their upper end portions in substantially the positions shown in Fig. 1. These two pendent frame members are connected with each other by floatingly mounted tie rods 35, which extend through suitable holes in the upright frame members 30 and cooperate in supporting the pendent frame members 33 and 34. Two sprocket wheels 36 and 37 are rotatably supported by bracket means 38, which extends upwardly from the respective pendent frame members. Two endless link belts 39 and 40, are operatively disposed on the sprocket wheels 36 and 37 and lower sprocket wheels (not shown), and said link belts are provided with slats, designated generally by 41, which may be of any of the forms disclosed in Figs. 3 to 10 inclusive. These slats 41, are positioned in edge to edge relation when the link belts are straightened out and said slats form filter chamber walls for the support of filter belts 42 and 43, which are shown by broken lines in Fig. 1, and in cross section in Fig. 2. The link belts with the slats connected therewith are hereinafter termed slat belts. Liquid pick-up devices 29 are positioned in contact with the back faces of the slats 41 to pick up the liquid which passes through said slats. The filter belts 42 and 43 are of material suitable to permit liquids to be expressed therethrough and the slats 41 are constructed so that the liquids forced out through the filter belts 42 and 43 can be taken off through the slats. The link belts 39 and 40 have rollers 45 therein which run on track members 44 on the pendent frame members 33 and 34 as shown in Fig. 2.

The edges of the filter chamber formed between the slats 41 are preferably closed by flexible impervious belts 46, which are supported by other slat belts 47, as best shown in Fig. 2. The link belts 39 and 40, and impervious belts 46, cooperate to form therebetween a chamber 48, which is wider at the top and narrower at the bottom and in which material may be subjected to increasingly high pressure as it travels downwardly through chamber 48 to press the liquids out of the same. The link belts 39 and 40 are driven in the directions indicated by the arrows and the filter belts 42 and 43 and impervious belts 46 move in the same direction and at the same speed.

As high pressures are built up in the chamber 48, and the liquid from the material to be separated is forced out through the slats, which in most instances, support the filter belts, it is essential that the slats be of strong construction and be provided with drainage means for taking care of this liquid and conveying such liquid away from the solid matter and disposing of this liquid so that it can not be re-absorbed into the cake of solid matter which will be continuously discharging from the lower end portion of the machine. Several types of slats for accomplishing this purpose are hereinafter described, the preferred type being disclosed in Figs. 11 to 15 inclusive.

These slats have three important functions; first, they form supporting means to withstand the pressures which are exerted against the filter cloths or belts; second, they serve to collect and direct the liquid filtrate to a definite position; third, they serve to drain the filtrate promptly away from the filter cloth or slat face. In every case the cracks between the edges of adjacent slats slope downwardly and away from the filter chamber, due to the fact that the filter chamber is slightly wedge shape or convergent from top to bottom.

Where reference is made in this specification to top edge and bottom edge of these slats, it will be understood that these terms refer to the slats in the position in which they form the filter cloth supporting means or walls of the filter chamber, it being obvious that these slats are reversed in position as they pass around the upper and lower sets of sprocket wheels.

In Figs. 3, 4, 5 and 6, I have shown a metal slat 50 provided with internal cavities 51 having ribs 52 therebetween. The face side of the slat 50 is recessed to leave a narrow marginal portion 53 which projects beyond the plane common to the front edges of the ribs 52. The face of the slat may be formed by a relatively strong and heavy close-mesh wire screen 54, which fits within the recessed portion and is flush with the marginal portion 53. Tie wires 55, Fig. 6, may be used to secure the wire-mesh face 54 in place. Holes 56 may be provided in the slat 50 to facilitate securing the same to a link belt. The wire-mesh 54 serves as a support against which filter cloth may be pressed. Liquid filtrate which is forced through said filter cloth presses readily through said wire-mesh into the cavities 51. The front edges of the ribs 52 may be notched as at 57 and 58, so that this liquid filtrate may flow from the cavities 51 to a centrally located discharge opening 59 and be discharged through the back wall of the slat where it is picked up by liquid filtrate pick-up mechanism, as hereinafter described. The top edge of the slat 50 has a depression 60 therein to catch liquid filtrate which finds its way into the space between the slats. A hole 61 extends from the bottom of this depression to the interior cavities of the slat, whereby liquid filtrate collecting in the depression 60 will be drained off through the slat. The top edge of each slat 50 is further beveled at the rear corner as at 62 to facilitate drainage of filtrate to the rear and the bottom edge of each slat has a groove 63 positioned directly over the beveled portion 62 of the next adjacent slat below, said groove 63 forming an edge from which liquid will tend to drip and the bevel 62 tending to prevent this drip from running forwardly between the slats.

The space between the two lowermost horizontal wires of the wire mesh member 54 is preferably filled or otherwise blocked up or obstructed as shown at 65, Fig. 4, to thereby form a lip or dam to cause the liquid filtrate to flow rearwardly away from the wire mesh and to further prevent any residual filtrate from running back into the filter cloth as the slat moves away from the body of material which has just passed out of the pressure zone. A narrow ledge or dam 66, positioned just inside of the bottom edge of the slat face 54 may be used instead of the filling shown at 65. Also, there may be provided a dam 67, whereby filtrate which trickles down the screen may be maintained away from the compressed solid matter of the material being treated forming the cake and positively directed to passageways 68, providing positive isolating for filtrate from the expanding vacuum-creating cake. Experience has taught that the filtrate tends to collect in the lower meshes of the filter face from which, unless provision such as dam 67, is provided, it is reabsorbed into the cake by the vacuum action of the expanding cake when the pressure is released. Passageways 68, Fig. 5, extend from the bottom of the screen 54 to the bottom edge of the slat, whereby filtrate may be drained into the depression 60 in the top of the next adjacent slat below. A vertical groove 69 is provided in each end of each slat 50 near the front side thereof and one or more holes 70 are provided in the bottom of each groove 69 and extend through the end wall of the slat to the space inside. When the slat is in use, a filter cloth may extend around the end thereof, and any liquid filtrate which is forced edgewise through this filter cloth may enter the groove 69 and pass into the inside of the slat through the holes 70.

When a wire mesh face 54 is used on the face side of the filter slats, as shown in Figs. 3 to 6, it permits the liquid filtrate to pass freely through the filter cloths which are pressed against said wire mesh, but I find that the heavy pressures within the pressure chamber may stretch and even tear the filter cloth, by pressing it into the spaces between the wires. I overcome this tendency preferably by subjecting the wire mesh to a very high pressure to thereby flatten out said wire mesh before it is installed on the faces of the slats. The flattening of the wire mesh affords a flatter surface and more bearing area for the filter cloth and prevents injury of the filter cloth. This flattening of the wires is shown in Fig. 5.

Fig. 10 shows a fragment of a perforated plate 71, which may be used on the slat 50 in place of the wire mesh 54. One advantage of this perforated plate 71 over the wire mesh 54 is that it affords a more even surface and there is less tendency to stretch a filter cloth which is pressed against the front of the slat. By omitting or filling one row of holes near the bottom edge of the plate 71, as shown at 72, the same result is obtained as by the use of the filler 65 in Fig. 4, a consideration particularly important where excessive pressures are employed.

The slat 73 shown in Figs. 7, 8 and 9, is also of metal construction and has cavities 74 on the inside into which liquid filtrate may pass. A rib 75 extends lengthwise within said slat 73 and is flush with the front edge of the slat. The face of the slat 73 is formed by a metal plate 76 which has slots 77 with rearwardly diverging walls and is secured to the slat 73 by screws 78. The slots 77 and the supporting surfaces between said slots are of suitable shape, size and positioning so that liquid filtrate which is pressed through a filter cloth, supported by the plate 76, will pass through the slots 77 into the interior cavities 74 of the slat and be discharged from the rear side of the slat through openings 79. Openings 80, shown by dotted lines in Fig. 7, may be provided in the rib 75 for filtrate to pass through. The slat 73 has holes 81 formed in enlarged portions of the rib 75 through which holes 81 bolts or cap screws 82 may extend for the purpose of securing the slats 73 to the link belts. The heads of the cap screws 82 are positioned in openings 83 in the plate 73 and may be flush with the front side of said plate 73, see Fig. 9. The bottom edge of each slat 73 may have a packing strip 84 cemented or otherwise secured thereto, which tends to exclude filtrate from the space between said slats. The top edge of each slat 73 may have a depression 85 communicably connected with the interior of the slat by notches 86 to catch any filtrate which finds its way between the slats and to direct said filtrate into the cavity within the slat. A horizontal slot 87 is provided along the bottom of the plate 76 to afford a means for receiving filtrate in a portion of the plate not otherwise provided with slots. The filtrate entering the slot 87 passes down through openings formed by notches 88 in the inner side of the plate and will ordinarily find its way into the cavities of the next adjacent slat through the depression 85 and notches 86. It will be noted, in Figs. 7 and 8 that the slots 77 terminate above the level of the bottom of the interior cavity 74 of the slat 73, and that the slot 87 is closed at the inner side of the edge of the slat, thereby leaving a lip or dam at 89 which corresponds in purpose and function with the lip or dam 65 in Figs. 3 and 5, previously described. Drain holes 90 are provided in the back of each slat 73, preferably just below the top wall and just below the rib 75 of said slat, to facilitate washing out, cleaning and sterilization of the interior cavities of said slats. It will be apparent that these drain holes 90 will be in a suitable position to allow all liquid to drain out of the slats when the position of the slats is reversed. This washing out may be done by directing a spray of water through the slotted face of the slats as they are moving upwardly on the outer sides of the machine, said slats then being free from the filter cloth. The end walls of the slats 73 are notched at the front edges, as at 91, Fig. 9, to afford passageways through which liquid filtrate in the edges of a filter cloth which extends around the ends of said slats may flow into the slats. In Fig. 9 I also disclose a preferred method of mounting the links 92 on the slats by countersinking the base portion 93 on each link into the slat, whereby the ends of the link portion 93, will shut against solid metal shoulders in the slat and the tendency to shear off the bolts 94 will be greatly lessened.

The filter belts contacting the slat face 76 may be treated or impregnated to render them repellent to filtrate. An example of such a filtrate repellent material, when water constitutes the filtrate, would be a filter belt made of a fabric in which the threads had been treated or impregnated with paraffin. A filtrate repellent fabric or belt of this nature will cause the filtrate which collects in the holes or slots of the slat face 76 to form globules 95 when said filtrate is exposed to the vacuum suction action arising from the expanding cake when pressure is released. When filtrate is thus induced to assume the globular form, space is left between said globules for air to pass to relieve the vacuum like action without carrying said filtrate back into the filter belt and into the cake. Treating the slat faces with filtrate repellent material, such as aluminium stearate, also renders these faces repellent to the return of filtrate and helps to cause any filtrate in the passageways in said slat faces where experience teaches it naturally forms as a film, to assume a globular form and allow air to pass inwardly without carrying the filtrate back into the cake. Thus, either the filter belts or the slat faces or both may be treated with water repellent material. Among the metals, applicant has discovered that duraluminium is inherently less aqueous filtrate film forming than other metals.

In Figs. 11 to 16 inclusive, I have disclosed a type of slat similar in many ways to those disclosed in the preceding figures, but which differs somewhat in construction and in the arrangement of the liquid take off and pick up means and in the means for closing the ends or sides of the filter chambers. The machine with which these slats are used is of somewhat similar construction to the machine disclosed fragmentarily in Figs. 1 and 2, and is also fragmentarily shown in Figs. 11 and 12.

The machine disclosed in Figs. 11 and 12 comprises two pendent frames 120 and 121, corresponding to the pendent frames 33 and 34 of Fig. 1. The pendent frames 120 and 121 are of strong construction and are suspended from pivot means 122. Two link belts 123 and 124 are mounted on the pendent frames 120 and 121 respectively, and preferably have rollers 125, which roll on suitable track means 125', on the pendent frames the said track means extending over semi-circular members 126 on the upper end portions of the pendent frames. As this application relates to the slats 127, carried by the link belts 123, these slats 127, are shown in detail in Figs. 13 to 16. These slats 127, are preferably of metal of substantially the cross sectional shape shown in Fig. 13, said slats 127 having longitudinal channels 128 on their front sides, between which are longitudinally extending inclined ribs 129, which are inclined downwardly from front to rear so that liquid contacting said ribs will immediately flow away from the face of the slat. The uppermost forward portions 130 of the inclined ribs 129, preferably are substantially knife edges positioned in contact with a slat face 131 of porous or perforate construction, so that liquid entering through the slat face 131 will be directed outwardly by these knife edge portions into the channels 128 and quickly removed from the slat face 131. The slat face 131 may conform to any of the slat face constructions previously described. The inclined ribs 129 merge with an integral web portion 132, which is positioned substantially in the medial plane of the slat. This web portion 132, has medial ribs 133, a top rib 134, and a bottom rib 135, on the rear side thereof as shown. The top edge portion of each slat 127 has a longitudinally extending groove 136, for the collection of liquid which finds its way between the slats. The surface 137, between the groove 136 and the face of the slat is inclined downwardly from the face of the slat toward the groove 136 to provide for drainage of liquid away from face of the slat. The surface 138—138' on the top edge portion of the slat 127 between groove 136 and the rear face of the slat is inclined upwardly for a short distance from the vertex of the groove and is thence inclined downwardly toward the rear of the slat to promote better drainage. The bottom edge portion of the slat 127 has an inclined surface 139, which conforms to the incline of the surface 137 and another inclined surface 140, which conforms to the inclined surface 138' and diverges from the inclined surface 138, of the adjacent slat. A plate 141 is secured to the rear side of each slat and the link belts 123—124 are secured to these plates 141, preferably by welding. A plurality of drainage passageways 142 extend from the bottom of the groove 136 on the top of each slat, downwardly through all of the inclined ribs 139 flush with the face of the web 132, so that liquid entering the groove 136 and channels 128, will immediately flow downwardly to the lowermost channel 128 of the slat and be discharged therefrom through openings 143 in the ends of the slat. It is to be noted that all of the liquid which enters the slat is conducted to the ends of the slat and discharged at the side of the machine. Tubes or pipes 144 of proper shape and curvature, as shown in Figs. 11 and 12 are fixedly secured to the slats 127 in communication with the openings 143 and deliver the discharging liquid into vertical conduits 148, through which the liquid flows downwardly to suitable receiving means, not shown.

To provide edge closure means for the pressure chamber 167, formed between the slats 127 of the two slat belts, I provide, on the ends of the slats 127 of one of said slat belts, slat wings 145, which are positioned in planes substantially parallel to the ends of the slats.

These slat wings are preferably secured to the slats by tie rods 146, which each extend throughout the length of the slat and through the slat wing 145 at each end of the slat and have nut means 147 for tensioning the same. These tie rods 146 are positioned in the channels between the ribs 133, 134 and 135 on the outer side of the slat. When the nuts 147 are tightened the slat wings 145 are held firmly against the ends of the slats 127, so that leakage of liquid between the slat wings and the ends of the slats 127 is prevented. The contacting surfaces at this location may be accurately finished, or packing may be provided therebetween. Preferably the slat wings 145 are inclined relative to the horizontal, as shown in Fig. 11, so that these slat wings will have a downward incline while the slats are in a position in which they form one side of the pressure chamber. This downward incline will cause liquid which may escape between said slat wings 145 to flow to the outer ends of said slat wings 145 from which it may discharge into any suitable conduit means 148, see Fig. 12. The top and bottom edges 149, of the slat wings 145, are inclined as shown in Fig. 15 to promote a flow of liquid toward the outer side of the slat wing. A combined reinforcing rib and trough 150 extends lengthwise of each slat wing on the outer side thereof, and provides conduit means to catch liquid flowing down the outer side of the slat wing and to conduct said liquid to the outer end of the slat wing. By inclining the slat wings 145, so that liquid will tend to flow to the outer end thereof, I find that there is less danger of such liquid finding its way back into the solid matter or cake from which it has been expressed than there will be if the slat wings are inclined in the opposite direction, so that there is a tendency for this liquid to flow toward the slats and past the pressure chamber.

However, in some instances, it may be desirable to incline the slat wings in the opposite direction, as shown in Fig. 16, so that liquid escaping between said slat wings 145 will enter the trough 151 and be conducted toward the slats. When the slat wing is thus used the inner end of the trough is obstructed by a transverse dam 152, and a drainage hole 153 is provided, extending from the inner end portion of the trough 151 to one of the internal channels 128 of the slat 127. The liquid escaping between the end wings 145 of the slats 127 is thus delivered to the interior of the slats and discharged with the remainder of the liquid which enters said slats.

Where the end wings 145 are provided on the slats of one slat belt, the slats of the other slat belt enter between said end wings, as shown in Figs. 11 and 12, and filter belts 123 and 124 may be used in connection with these slats.

I claim:

1. In a continuous pressure separating device of the class described, two traveling slat belts cooperating to form a pressure chamber, each slat of said slat belts comprising a hollow structure with a relatively thin walled face having filtrate passageways therethrough, said traveling slat belts mounted for movement with the slat faces substantially vertical when filtering, and drainage wall means of substantial area disposed within the hollow slat structure, contacting with and inclined downwardly and away from the slat face, whereby said wall means will reinforce said slat faces and filtrate will tend to move downwardly and away from said slat face on said wall means and filtrate contacting said walls will tend to adhere thereto thus minimizing any tendency of filtrate to return through said faces.

2. In a continuous pressure separating device of the class described, two traveling slat belts cooperating to form a pressure chamber, each slat of said slat belt comprising a hollow structure with a relatively thin walled face having filtrate passageways therethrough, said traveling slat belts mounted for movement with the slat faces substantially vertical when filtering, whereby drainage of filtrate to the interior of the slat is provided, a drainage depression disposed in the upper external surface of each slat for collecting filtrate expressed between adjacent slats, drainage means communicating between said drainage depression and the interior of the slat, and other drainage means communicating between the interior of the slat and the exterior thereof.

3. In a device of the class described, two slat belts cooperating to form a pressure chamber; end wings secured to the slats of one of said slat belts forming closure means at the edges of the pressure chamber and receiving therebetween the slats of the other slat belt; and trough drainage means rigidly secured to and protruding from an outer face of each of said end wings and extending lengthwise thereof, whereby said trough drainage means will also function to reinforce the end wings to which they are rigidly secured.

4. In a continuous pressure separating device of the class described, two traveling slat belts cooperating to form a pressure chamber, each slat of said slat belts comprising a hollow structure with a face having filtrate passageways therethrough, said traveling slat belts mounted for movement with the slat faces substantially vertical when filtering; and inclined traveling discharge conduit means communicatively connected with the interior of each slat and having a liquid delivery portion extending to a location which is downwardly and remotely positioned from the slat to which it is connected; and a relatively fixed liquid receiving means having a vertical groove positioned in the path of travel of the delivery portion of said discharge conduit means and positioned to receive liquid discharged from the liquid delivery portion of said discharge conduit means.

5. In a device of the class described, a slat belt, each slat of said slat belt comprising a hollow structure with a pressure sustaining face having filtrate passageways therethrough; a filtrate receiving groove extending lengthwise of the slat in the side which is uppermost when the slat is in a position in which it cooperates in forming one wall of a pressure chamber; and drainage openings extending from the bottom of said groove to the interior of the slat.

6. In a device of the class described, a slat belt, each slat of said belt comprising a hollow structure with a pressure sustaining face having filtrate passageways therethrough; a filtrate receiving groove extending lengthwise of the slat in the side which is uppermost when the slat is in a position in which it cooperates in forming a wall of a pressure chamber; drainage openings providing drainage from the bottom of said groove to the interior of said slat; and drainage means extending from the interior to the exterior of the slat at the end portion of the slat.

7. In a device of the class described, a slat belt, each slat of said belt comprising a hollow structure with a pressure sustaining face having filtrate passageways therethrough; a plurality of longitudinally extending flanges within the interior of said slat supporting said pressure sustaining face, said flanges being inclined downwardly in a direction away from said face when the slat is in a position in which it cooperates in forming a wall of a pressure chamber; a filtrate receiving groove extending lengthwise of the slat in the side which is uppermost when the slat is in a position in which it cooperates in forming a wall of a pressure chamber; and drainage openings providing drainage from the bottom of said groove to the interior of said slat and through the flanges within said slat.

8. In a device of the class described, two slat belts cooperating to form a pressure chamber; and slat wings secured to the end portions of the slats of one of said slat belts, said slat wings forming closure means at the edges of said pressure chamber and receiving therebetween the slats of the other slat belt, the edges of said slat wings being beveled to provide a downward slope from the inner to the outer side of said slat wings when the slats are in positions in which they cooperate in forming the pressure chamber.

9. In a device of the class described, two slat belts cooperating to form a pressure chamber; and slat wings secured to the end portions of the slats of one of said slat belts, said slat wings forming closure means at the edges of said pressure chamber and receiving therebetween the slats of the other slat belt, said slat wings being inclined downwardly, so that their outer ends remote from the slats are lower than the ends which are secured to the slats when the slats are in positions in which they cooperate in forming the pressure chamber, thereby providing for drainage of filtrate away from said slats.

10. In a device of the class described, two slat belts cooperating to form a pressure chamber; slat wings secured to the end portions of the slats of one of said slat belts extending substantially perpendicularly from the slats, said slat wings forming closure means at the edges of said pressure chamber and receiving therebetween the slats of the other slat belt; and trough means extending lengthwise of each slat wing on the outer side of the same, and positioned to collect filtrate on the exterior of the slat wing and conduct said filtrate to the end of the slat wing.

11. In a device of the class described, two slat belts cooperating to form a pressure chamber; slat wings secured to the end portions of the slats of one of said slat belts extending substantially perpendicularly from the slats, said slat wings forming closure means at the edges of said pressure chamber and receiving therebetween the slats of the other slat belt, said slat wings being inclined relative to the slats so that the ends of the slat wings which are secured to the slats are lower than the other ends of said slat wings when the slats are in positions in which they cooperate in forming the pressure chamber; trough means extending lengthwise of each slat on the outer side of the same positioned to collect filtrate on the exterior of the slat wing and conduct said filtrate to a position opposite the end of the slat; and conduit means extending from the trough means to the interior of the slat whereby said filtrate will be delivered to the interior of the slat.

12. In a continuous pressure separating device of the class described, a traveling slat belt, each slat of said belt comprising a hollow structure with a face having filtrate passageways therethrough; spaced apart rib means contacting said face and sloping downwardly away from said face whereby liquid will be rapidly removed from said face between spaced apart ribs; and traveling drainage conduit means communicatively connected with the lowermost portion of each slat and having a delivery portion positioned at a location remote from said slat, whereby said liquid will be removed from the slat and conducted to a location remote from said slat.

13. In a device of the class described, a slat belt, each slat of said belt comprising a hollow structure with a face having filtrate passageways therethrough, and each slat having longitudinally extending grooves in the rear side portion thereof external of said hollow structure; two end wings positioned at the respective ends of each slat and adjustable tie rods extending lengthwise through said grooves securing said end wings to said slats with the desired tension.

ROBERT M. THOMPSON.